United States Patent
Jeon et al.

(10) Patent No.: US 10,167,093 B2
(45) Date of Patent: Jan. 1, 2019

(54) APPARATUS AND METHOD FOR CONTROLLING A SATELLITE

(71) Applicant: KOREA AEROSPACE RESEARCH INSTITUTE, Daejeon (KR)

(72) Inventors: Moon Jin Jeon, Daejeon (KR); Sang Rok Lee, Daejeon (KR); Hui Kyung Kim, Daejeon (KR); Eung Hyun Kim, Daejeon (KR); Seong Bin Lim, Daejeon (KR); Seok Weon Choi, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/661,698

(22) Filed: Jul. 27, 2017

(65) Prior Publication Data

US 2017/0320599 A1    Nov. 9, 2017

Related U.S. Application Data

(63) Continuation of application No. 14/955,514, filed on Dec. 1, 2015, now Pat. No. 9,751,645.

(30) Foreign Application Priority Data

Sep. 10, 2015   (KR) ........................ 10-2015-0128222
Oct. 26, 2015   (KR) ........................ 10-2015-0148893

(51) Int. Cl.
*B64G 1/36*   (2006.01)
*G05D 1/00*   (2006.01)
*G05D 1/08*   (2006.01)

(52) U.S. Cl.
CPC ........... *B64G 1/365* (2013.01); *G05D 1/0094* (2013.01); *G05D 1/0883* (2013.01)

(58) Field of Classification Search
CPC ..... B64G 1/365; G05D 1/0094; G05D 1/0883
USPC .......................................................... 701/13
See application file for complete search history.

(56) References Cited

U.S. PATENT DOCUMENTS

| | | | |
|---|---|---|---|
| 4,288,051 A * | 9/1981 | Goschel | B64G 1/26 244/164 |
| 5,999,211 A | 12/1999 | Hedges et al. | |
| 2002/0149674 A1 | 10/2002 | Mathews et al. | |
| 2008/0237399 A1 * | 10/2008 | Caplin | B64G 1/1085 244/158.4 |
| 2012/0113257 A1 | 5/2012 | Noguchi et al. | |

FOREIGN PATENT DOCUMENTS

WO         97/42659 A1     11/1997

* cited by examiner

*Primary Examiner* — Marthe Y Marc-Coleman
(74) *Attorney, Agent, or Firm* — Maier & Maier, PLLC

(57) ABSTRACT

Provided is an apparatus for controlling an orbiting satellite by sensing a change in a yaw angle of the orbiting satellite and calculating a ground sample distance (GSD) based on the yaw angle. The apparatus may include a sensor configured to sense a yaw angle corresponding to yaw steering of the orbiting satellite, and a processor configured to calculate, based on the yaw angle, a GSD corresponding to a length of a pixel projected onto a planetary surface scanned by the orbiting satellite.

19 Claims, 7 Drawing Sheets

APPARATUS AND METHOD FOR CONTROLLING A SATELLITE

CROSS-REFERENCE TO RELATED APPLICATIONS

This application is a continuation of U.S. patent application Ser. No. 14/955,514, filed Dec. 1, 2015, pending, which application is incorporated herein by reference in its entirety.

This application claims the benefit of Korean Patent Application No. 10-2015-0128222 and of Korean Patent Application No. 10-2015-0148893, respectively filed on Sep. 10, 2015 and Oct. 26, 2015, in the Korean Intellectual Property Office, the disclosures of which are incorporated herein by reference.

BACKGROUND

1. Field of the Invention

Embodiments relate to an apparatus and method for controlling an orbiting satellite, and more particularly, to a method of calculating a line rate to adjust a scanning speed of a low earth orbit (LEO) satellite that scans a planetary surface.

2. Description of the Related Art

An image acquisition operation performed by a multi-purpose satellite may be broadly classified into strip imaging, stereo imaging, multi-point imaging and wide area imaging. The wide area imaging may refer to scanning a ground in an arbitrary direction.

To perform the wide area imaging, the multi-purpose satellite may use a push broom camera. The push broom camera may scan objects on a ground by looking over the objects as if sweeping with a broom. Accordingly, the wide area imaging may be performed by setting, in advance, a speed at which a single line of an image is scanned to correspond to an orbital velocity of the multi-purpose satellite. A line rate may refer to a number of image lines scanned for 1 second, and may be calculated using Equation 1 shown below.

$$\text{Line rate} = \frac{\text{Ground velocity}}{\text{GSD}} \quad \text{[Equation 1]}$$

Referring to Equation 1, a ground velocity represents a ground velocity of a line of sight (LOS) of a satellite camera of the multi-purpose satellite, and a ground sample distance (GSD) represents a size of a pixel scanned by the satellite camera and projected onto the ground. A value of the line rate may be determined based on attitude and position of the multi-purpose satellite.

A scheme of calculating a line rate during wide area imaging in a related art is performed based on only a distance from a multi-purpose satellite to a scanning ground point and a pitch angle corresponding to the attitude of the multi-purpose satellite. However, the scheme has a limitation in that the scheme is merely applicable to an example in which a speed direction and a scanning direction of the multi-purpose satellite are the same and that it is impossible to apply the scheme to wide area imaging performed in an arbitrary scanning direction.

SUMMARY

According to an aspect, there is provided an apparatus for controlling an orbiting satellite by sensing a change in a yaw angle of the satellite and calculating a ground sample distance (GSD) based on the yaw angle. The apparatus may include a sensor configured to sense a yaw angle corresponding to yaw steering of the orbiting satellite, and a processor configured to calculate a GSD based on the yaw angle, the GSD corresponding to a length of a pixel projected onto a planetary surface of a planet being scanned by the orbiting satellite.

The processor may be configured to calculate a trace of the projected pixel based on the change in the yaw angle, and configured to calculate the GSD based on the trace. The processor may be configured to calculate a major axis and a minor axis of an ellipse corresponding to the trace, and to calculate an elliptic equation as the trace.

The sensor may be configured to sense a roll angle and a pitch angle of the orbiting satellite and the processor may be configured to calculate the major axis and the minor axis using the following equation:

$$a = \frac{c}{\cos(\theta)\cos(\phi)}, \; b = c$$

where a denotes a length of the major axis, b denotes a length of the minor axis, φ denotes the roll angle, θ denotes the pitch angle, and c denotes the length of the pixel.

The processor may be configured to calculate the major axis and the minor axis based on a radius of the planet, an altitude from the planet to the orbiting satellite, an angle at which a pixel is viewed from a scanning focal point of the orbiting satellite, and an angle between a vertical vector from the orbiting satellite to the planet and a vector from the orbiting satellite to a scanning point at which the planet is scanned.

According to another aspect, there is provided an orbiting satellite for determining a scanning speed based on a line rate. The orbiting satellite may include a movement controller configured to control an attitude of the orbiting satellite, the attitude including an orbital velocity, a roll angle, a pitch angle and a yaw angle of the orbiting satellite, an image acquirer configured to scan a planetary surface in a scanning direction corresponding to the attitude, and a calculator configured to calculate a line rate determined based on the orbital velocity and the yaw angle, and to determine a scanning speed of the image acquirer.

When the yaw angle is set to "0," the calculator may be configured to project, onto a plane in which the yaw angle is measured, each of vectors obtained by projecting a direction vector and a line of sight (LOS) vector of the image acquirer onto the planetary surface, and to calculate a tilt angle between the projected direction vector and the projected LOS vector. In addition, the calculator may be configured to calculate, based on a difference between the yaw angle and the tilt angle, a GSD corresponding to a length of a pixel projected onto the planetary surface scanned by the image acquirer, and configured to calculate the line rate based on the GSD and the orbital velocity.

According to still another aspect, there is provided a method of calculating a line rate corresponding to a scanning direction of an orbiting satellite. The method may include sensing an attitude of the orbiting satellite, the attitude including a roll angle, a pitch angle and a yaw angle of the orbiting satellite, calculating a trace of a pixel projected onto a planetary surface of a planet being scanned by the orbiting satellite, and calculating the line rate based on the attitude and the trace.

The calculating of the trace may include calculating a major axis and a minor axis of an ellipse corresponding to the trace using the following equation:

$$a = \frac{c}{\cos(\theta)\cos(\phi)}, b = c$$

where a denotes a length of the major axis, b denotes a length of the minor axis, $\phi$ denotes the roll angle, $\theta$ denotes the pitch angle, and c denotes the length of the pixel. The calculating of the line rate may include, when the yaw angle is set to "0," projecting, onto a plane in which the yaw angle is measured, each of vectors obtained by projecting a scanning direction vector of the orbiting satellite and a line of sight (LOS) vector between the orbiting satellite and a scanned object onto the planetary surface, and calculating a tilt angle between the projected direction vector and the projected LOS vector.

The calculating of the trace may include calculating a major axis and a minor axis of an ellipse corresponding to the trace based on a radius of the planet, an altitude from the planet to the orbiting satellite, an angle at which a pixel is viewed from a scanning focal point of the orbiting satellite, and an angle between a vertical vector from the orbiting satellite to the planet and a vector from the orbiting satellite to a scanning point at which the planet is scanned.

The calculating of the line rate may include calculating the tilt angle using the following equation:

$$\beta = \tan^{-1}\left(\frac{a\tan(\phi)}{b\tan(\theta)}\right)$$

where $\beta$ denotes the tilt angle.

The calculating of the line rate may include calculating a GSD corresponding to a length of the pixel projected onto the planetary surface, using the following equation:

$$d = \sqrt{a^2\cos(\psi+\beta)^2 + b^2\sin(\psi+\beta)^2}$$

where d denotes the GSD and $\psi$ denotes the yaw angle.

According to yet another aspect, there is provided a non-transitory computer-readable storage medium storing a program for causing a processor to perform a method of calculating a line rate corresponding to a scanning direction of an orbiting satellite. The program may include a set of instructions to calculate a trace of a pixel projected onto a planetary surface scanned by the orbiting satellite, and a set of instructions to calculate the line rate based on the trace and an attitude, the attitude including a roll angle, a pitch angle and a yaw angle of the orbiting satellite.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Specific structural or functional descriptions of embodiments are merely intended for the purpose of describing embodiments, and various modifications may be made to the embodiments. Accordingly, it should be understood that these embodiments are not construed as limited to the illustrated forms and include all changes, equivalents or alternatives within the idea and the technical scope of this disclosure.

It will be understood that, although the terms first, second, etc. may be used herein to describe various elements, these elements should not be limited by these terms. These terms are only used to distinguish one element from another element. For example, a first element could be referred to as a second element, and similarly, a second element could be referred to as a first element.

It will be understood that when it is mentioned that one element is "connected to" another element, the one element is directly connected or accessed to the other element or intervening elements are also present.

A singular expression includes a plural concept unless there is a contextually distinctive difference therebetween. In the present specification, the term "include" or "have" is intended to indicate that characteristics, numbers, steps, operations, components, elements or combinations thereof described in the specification exist. As such, the term "include" or "have" should be understood that there are additional possibilities of one or more other characteristics, numbers, steps, operations, components, elements or combinations thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
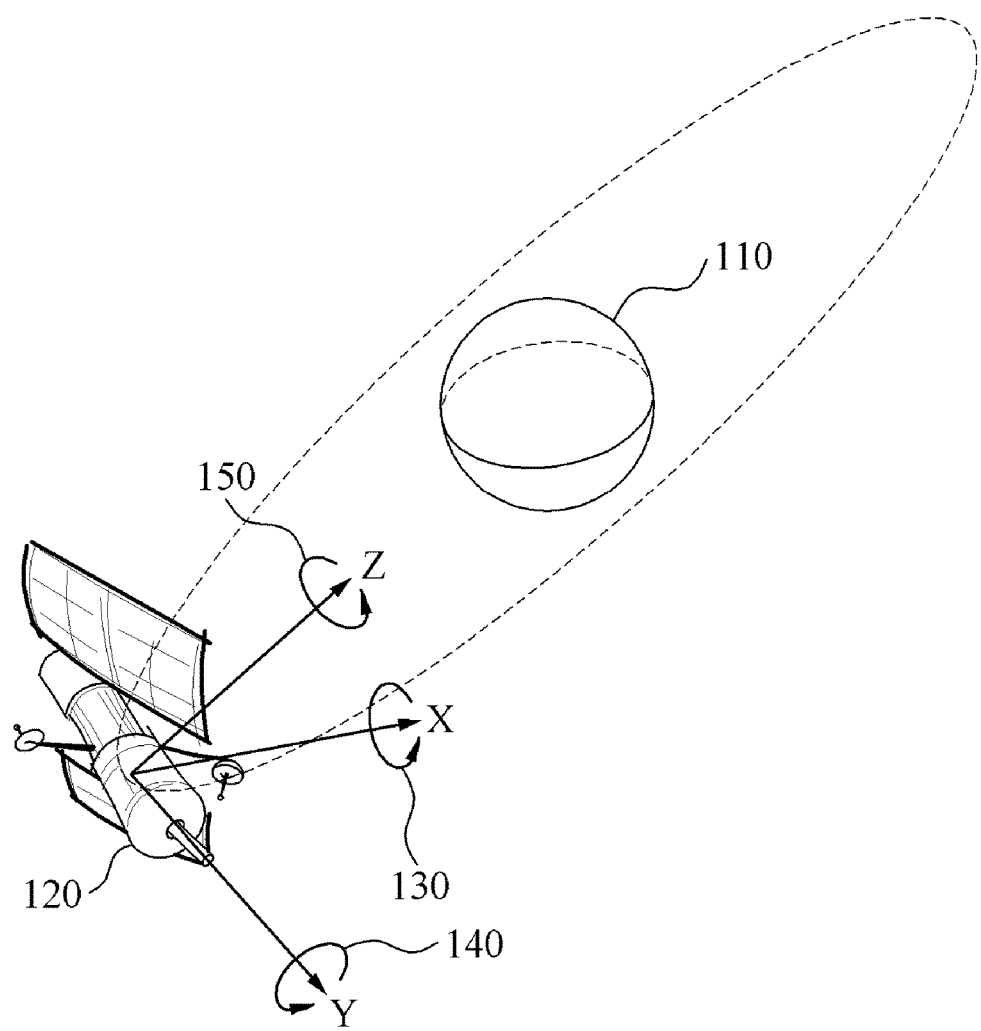
FIG. 1 is a diagram illustrating an example of an orbiting satellite and a planet according to an embodiment.

FIG. 1 is a diagram illustrating an example of an orbiting satellite 120 and a planet 110 according to an embodiment. Referring to FIG. 1, the orbiting satellite 120 may orbit around the planet 110. The planet 110 may refer to a celestial body that revolves around a fixed star and that does not generate light, and may include, for example, Earth, Mercury, Venus, and Mars. However, this is merely an example, and the orbiting satellite 120 may be, for example, a satellite revolving around a planet based on gravitation of the satellite, or an orbiting satellite that scans surroundings of a high-temperature fixed star that generates its own light through a fusion reaction.

An attitude of the orbiting satellite 120 may include a roll angle, a pitch angle and a yaw angle. FIG. 1 illustrates a first rotation direction 130, a second rotation direction 140 and a third rotation direction 150. The first rotation direction 130 may be a direction of rotation about a direction in which the orbiting satellite 120 moves, that is, an x-axis, and may correspond to the roll angle. The second rotation direction 140 may be a direction, that is, a y-axis that is perpendicular to the x-axis and an orbital plane and may correspond to the pitch angle. The third rotation direction 150 may be a direction, that is, a z-axis that is perpendicular to the x-axis and that is oriented toward the planet 110, and may correspond to the yaw angle.

The orbiting satellite 120 may change an attitude corresponding to the yaw angle during scanning of a planetary surface of the planet 110. When the orbiting satellite 120 moves along the orbital plane, an external environment, for example, light of the sun, an albedo and radiant heat of the earth may change based on the attitude, which may be a condition that has an influence on scanning of the planetary surface and movement of the orbiting satellite 120.

In a scanning scheme according to a related art, for example, a strip imaging scheme, a stereo imaging scheme or a multi-point imaging scheme, information about a pose profile and a location of an orbiting satellite is secured and a line rate is calculated based on the information. However, the above scanning scheme has a limitation in that the scanning scheme is merely applicable to an example in which a precise location and pose profile are known in advance.

In a wide area imaging scheme according to the related art, a line rate may be calculated based on a distance from a satellite to a scanned object, and a pitch angle corresponding to, for example, the second rotation direction 140. However, when an orbiting satellite actually moves, the orbiting satellite may need to scan a planetary surface in an arbitrary direction by changing a yaw angle if necessary, and accordingly there is a need for a method of calculating a line rate based on a change in the yaw angle. Hereinafter, a method of calculating a line rate based on a change in a yaw angle will be further described.

Figure 2:
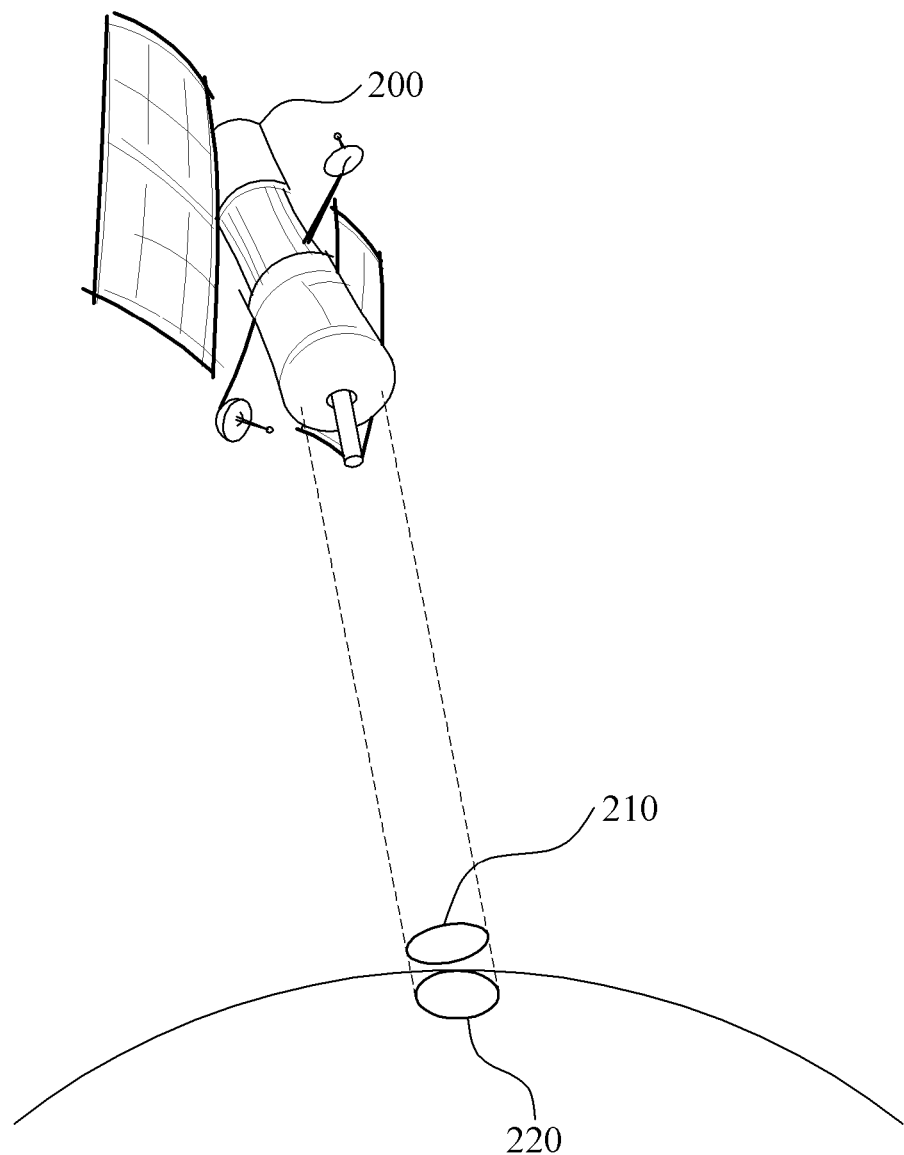
FIG. 2 is a diagram illustrating an example of an operation of an orbiting satellite to scan a planetary surface according to an embodiment.

FIG. 2 is a diagram illustrating an example of an operation of an orbiting satellite 200 to scan a planetary surface according to an embodiment. Referring to FIG. 2, the orbiting satellite 200 may scan the planetary surface. The orbiting satellite 200 may be an artificial object revolving around a planet. The orbiting satellite 200 may include, for example, a low earth orbit (LEO) satellite flying in an orbit lower than a geostationary orbit of about 36,000 kilometers (km) above the earth's equator.

The orbiting satellite 200 may acquire image data by scanning the planetary surface. A pixel displayed on a scanning device of the orbiting satellite 200 may have the same size as a size of a pixel 210 on the planetary surface, that is, an actually scanned object. The pixel 210 may refer to a pixel arranged in a direction perpendicular to a line of sight (LOS) direction of the orbiting satellite 200. The pixel 210 may include information about the planetary surface in the same range as that of a pixel 220 projected onto the planetary surface. The information about the planetary surface may include, for example, information associated with monitoring of development of a territory, for example, a road and a vehicle, an analysis of image map data, a crop analysis, or monitoring of disasters, for example, an earthquake and tsunami. In addition, when the pixel 210 is projected onto the planetary surface in the LOS direction of the orbiting satellite 200, the orbiting satellite 200 may calculate a size of the projected pixel 220, and acquire a ground distance corresponding to the pixel 220.

Figure 3A:
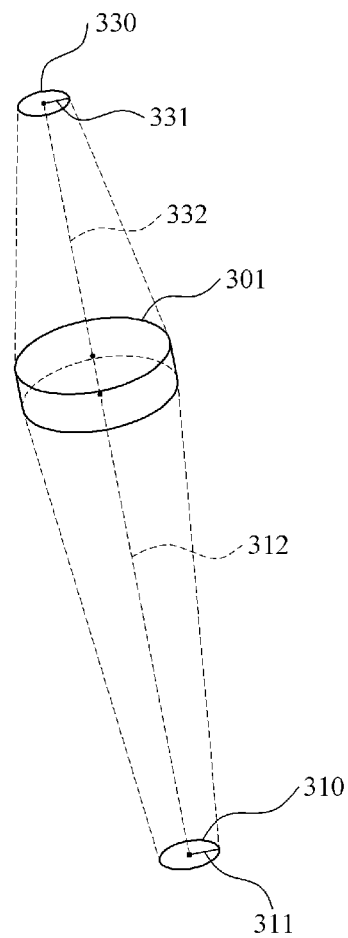
FIG. 3A is a diagram illustrating an example of an operation of an orbiting satellite to calculate a size of a pixel that is on a planetary surface and that corresponds to a pixel obtained by the orbiting satellite according to an embodiment.

FIG. 3A is a diagram illustrating an example of an operation of the orbiting satellite 200 to calculate a size of a pixel that is on a planetary surface and that corresponds to a pixel obtained by the orbiting satellite 200 according to an embodiment. The orbiting satellite 200 may include a scanning device configured to scan the planetary surface in a scanning direction corresponding to an attitude. The scanning device may be implemented as, for example, a charge-coupled device (CCD) camera for converting a scanned pixel to an electrical signal and storing the pixel as digital data. The scanning device of the orbiting satellite 200 may include a telephoto lens to scan details of the planetary surface.

FIG. 3A illustrates a telephoto lens 301 of the orbiting satellite 200. The orbiting satellite 200 may acquire, using the telephoto lens 301, image data 330 representing the planetary surface to be observed. The orbiting satellite 200 may calculate a LOS length 312 between the orbiting satellite 200 and a scanned object of the planetary surface, to calculate a size 311 of a pixel on the planetary surface. For example, the orbiting satellite 200 may perform modeling, as a plane, a straight line from a scanning point to a sub-satellite point at which a straight line from the orbiting satellite 200 to a center of a planet intersects a surface of the planet, and may acquire the LOS length 312 using Equation 2 shown below:

$$LOS\ length = \frac{\text{Altitude of mobile satellite}}{\cos(\theta)\cos(\phi)} \quad [\text{Equation 2}]$$

As described above, the attitude of the orbiting satellite 200 may be controlled based on the roll angle, the pitch angle and the yaw angle. In Equation 2, θ denotes a pitch angle of an orbiting satellite and φ denotes a roll angle of the orbiting satellite.

When the LOS length 312 is acquired, the orbiting satellite 200 may calculate the size 311 corresponding to the acquired image data 330, based on a size 331 of a pixel obtained by the orbiting satellite 200, an effective focal length 332 of the scanning device of the orbiting satellite 200, and the LOS length 312. For example, the orbiting satellite 200 may calculate the size 311 using Equation 3 shown below.

$$\text{Size of pixel on plenetary surface} = \frac{\text{Size of obtained pixel}}{\text{Effective focal length}} \cdot LOS\ length \quad [\text{Equation 3}]$$

A trace as an ellipse may be drawn by projecting the size 311 onto the planetary surface based on yaw steering of the orbiting satellite 200. Based on the size 311 calculated using Equation 3, a length of each of a minor axis and a major axis of the ellipse may be calculated using Equation 4 shown below.

$$a = \frac{C}{\cos(\theta)\cos(\phi)}, b = c \quad \text{[Equation 4]}$$

In Equation 4, a denotes a length of the major axis, b denotes a length of the minor axis, φ denotes the roll angle, θ denotes the pitch angle, and c denotes the size 311.

Figure 3B:
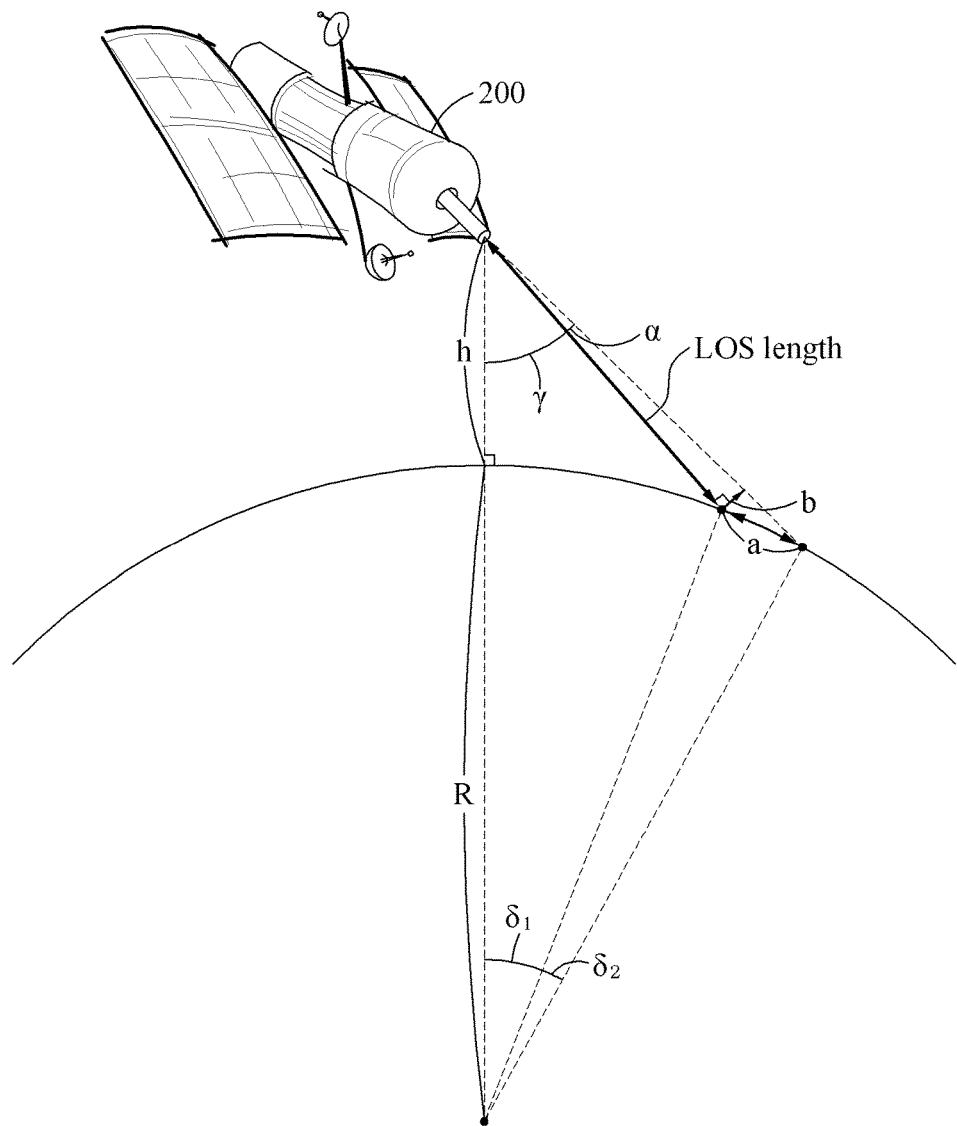
FIG. 3B is a diagram illustrating another example of an operation of an orbiting satellite to calculate a size of a pixel that is on a planetary surface and that corresponds to a pixel obtained by the orbiting satellite according to an embodiment.

FIG. 3B is a diagram illustrating another example of an operation of the orbiting satellite 200 to calculate a size of a pixel that is on a planetary surface and that corresponds to a pixel obtained by the orbiting satellite 200 according to an embodiment. Unlike the example of FIG. 3A, FIG. 3B illustrates an operation of calculating a more accurate LOS length because a planet scanned by the orbiting satellite 200 has a spherical shape. The orbiting satellite 200 may scan the earth in the example of FIG. 3B, however, it is obvious to one of ordinary skill in the art that the orbiting satellite 200 may scan various planets, fixed stars or satellites.

Referring to FIG. 3B, the orbiting satellite 200 may scan a surface of the earth with a radius R at an altitude h of the orbiting satellite 200. An angle α at which a single pixel is viewed from a focal point of the scanning device of the orbiting satellite 200 may be calculated using Equation 5 shown below.

$$\alpha = \tan^{-1}\left(\frac{\text{Size of obtained pixel}}{\text{Effective focal length}}\right) \quad \text{[Equation 5]}$$

In addition, an angle γ between a vertical vector from the orbiting satellite 200 to the earth and a direction vector from the orbiting satellite 200 to a scanning point may be calculated using Equation 6 shown below.

$$\gamma = \cos^{-1}(\cos(\theta)\cos(\phi)) \quad \text{[Equation 6]}$$

In Equation 6, θ denotes the pitch angle of the orbiting satellite 200 and φ denotes the roll angle of the orbiting satellite 200. When an angle between a straight line from a sub-satellite point of the orbiting satellite 200 to a center of the earth and a straight line from the scanning point to the center of the earth is represented by $\delta_1$, an equation regarding a LOS length may be represented as Equation 7 shown below, based on a trigonometry of a sine function.

$$\frac{LOS \text{ length}}{\sin(\delta_1)} = \frac{R}{\sin(\gamma)} = \frac{R+h}{\sin(\gamma+\delta_1)} \quad \text{[Equation 7]}$$

When Equation 7 and the angle γ calculated using Equation 6 are used, the angle $\delta_1$ may be calculated using Equation 8 shown below.

$$\delta_1 = \sin^{-1}\left(\frac{R+h}{R}\sin(\gamma)\right) - \gamma \quad \text{[Equation 8]}$$

When the angle $\delta_1$ calculated using Equation 8 is substituted into Equation 7, a LOS length may be calculated based on the radius R, the altitude h and the angle α, using Equation 9 shown below.

$$LOS \text{ length} = \frac{R}{\sin(\gamma)}\sin\left(\sin^{-1}\left(\frac{R+h}{R}\sin(\gamma)\right)\right) - \gamma \quad \text{[Equation 9]}$$

Also, an angle between a straight line from the scanning point to the center of the earth and a straight line from the center of the earth to a point at which the pixel is projected when a direction of the pixel is the same as a LOS direction is represented by $\delta_2$, an equation regarding the angle $\delta_2$ may be represented as Equation 10 shown below, based on the trigonometry of the sine function.

$$\frac{\sin(\alpha+\gamma+\delta_1+\delta_2)}{R+h} = \frac{\sin(\alpha+\gamma)}{R} \quad \text{[Equation 10]}$$

The angle $\delta_2$ may be calculated using Equation 11 shown below, based on Equation 7.

$$\delta_2 = \sin^{-1}\left(\frac{R+h}{R}\sin(\gamma+\alpha)\right) - \sin^{-1}\left(\frac{R+h}{R}\sin(\gamma)\right) - \alpha \quad \text{[Equation 11]}$$

When a pixel obtained by the orbiting satellite 200 is projected onto the surface of the earth, a trace of the projected pixel may have a shape of an ellipse based on the yaw steering. A minor axis b of the ellipse may correspond to a size of a pixel based on a distance from the orbiting satellite 200 to the scanning point, and a major axis a of the ellipse may correspond to a size of a pixel in a LOS direction when the obtained pixel is projected onto the surface of the earth. The major axis a and the minor axis b may be calculated using Equation 12 shown below.

$$a = 2R\sin\left(\frac{\delta_2}{2}\right),$$
$$b = LOS \text{ length} \cdot \frac{\text{Size of obtained pixel}}{\text{Effective focal length}} \quad \text{[Equation 12]}$$

When a minor axis and a major axis of an ellipse corresponding to a trace of a pixel projected onto a planetary surface are calculated using Equation 4 described in FIG. 3A, the orbiting satellite 200 may expect an effect of quickly acquiring an approximate value of a ground sample distance (GSD) using a single operation. In addition, when the minor axis and the major axis are calculated using Equation 12 described in FIG. 3B, the orbiting satellite 200 may expect an effect of more accurately calculating the GSD based on a radius of a planet, an altitude of the orbiting satellite 200 and an angle at which a single pixel is viewed, to enhance an accuracy and reliability of the line rate.

Figure 4:
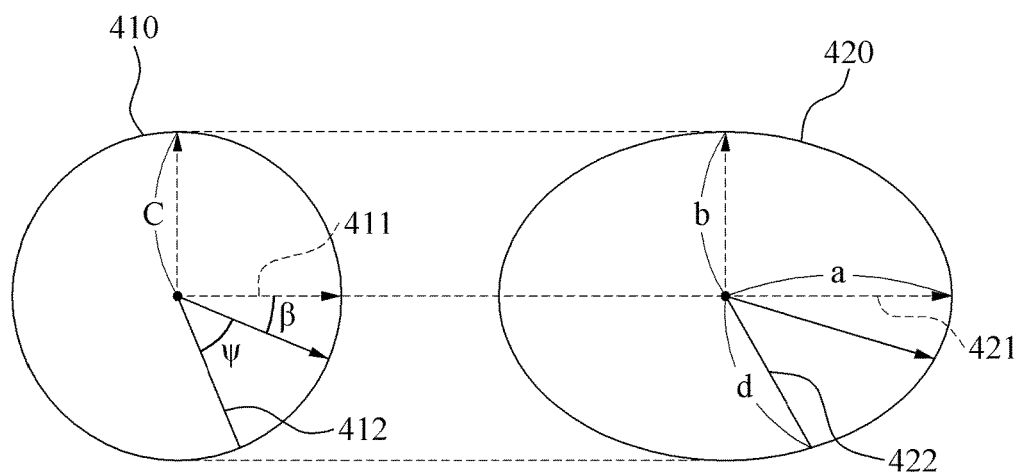
FIG. 4 is a diagram illustrating a size of a pixel projected onto a planetary surface.

FIG. 4 is a diagram illustrating a size of a pixel projected onto a planetary surface. FIG. 4 illustrates a pixel 410 of image data representing a planetary surface scanned by the orbiting satellite 200, and a pixel 420 projected onto the planetary surface. For example, an original pixel of image data acquired by the orbiting satellite 200 may have a quadrilateral shape. In this example, both a pixel on a planetary surface and a pixel projected onto the planetary surface may have quadrilateral shapes. However, the shape of the original pixel is not limited to the quadrilateral shape, and the original pixel may have various shapes that may be changed by one of ordinary skill in the art. For example, the original pixel may have a shape of one of a square, a rectangle, a polygon, and a circle.

A vector corresponding to a scanning direction of the original pixel may represent a circular trace of the pixel 410 based on a change in a yaw angle. When the pixel 410 is projected onto the planetary surface, the vector may represent an elliptical trace based on the change in the yaw angle. To facilitate understanding of a process of deriving a GSD corresponding to a scanning direction based on a change in a yaw angle, the pixel 410 may have a circular shape, and the pixel 420 may have an elliptical shape, as shown in FIG. 4. However, the above shapes of the pixels 410 and 420 should not be construed as limited to the scope of the right of the present disclosure.

The pixel 410 may be a pixel of the image data moved to the planetary surface at an altitude of "0" meter (m). A size of the pixel 410 may be calculated using the image data and Equation 3. For example, the pixel 410 may have a shape of a circle with a radius set to a size of a pixel on a planetary surface calculated using Equation 3. In addition, the pixel 420 may be a pixel projected onto the planetary surface in a LOS direction of the orbiting satellite 200. As described above, the pixel 420 may have the elliptical shape. The orbiting satellite 200 may calculate a major axis a and a minor axis b of the elliptical shape based on Equations 4 or 12. Equation 4 may correspond to modeling a line from the sub-satellite point to the scanning point as a plane, and Equation 12 may be calculated based on a model of a planet being scanned.

For example, an attitude of the orbiting satellite 200 may be controlled by changing a yaw angle when a roll angle and a pitch angle remain unchanged. In this example, the pixel 410 may move based on a first yaw angle $\psi_1$ and a second yaw angle $\omega_2$ while drawing a circle as a trace. On the same principle, a length of a pixel corresponding to a scanning direction of the orbiting satellite 200 may be a length of an axis of an ellipse, and the pixel 420 may move based on the yaw angle while drawing an ellipse as a trace.

In an example, when a first pixel 412 on the planetary surface is projected in a direction of a LOS vector 411 of the orbiting satellite 200, the first pixel 412 may be represented as a second pixel 422 in the pixel 420. In this example, the LOS vector 411 may be represented as a major axis 421 in the pixel 420. Also, β represents a tilt angle between two vectors obtained by projecting a scanning direction vector and a LOS vector of the orbiting satellite 200 onto the planetary surface when the yaw angle is set to "0," and by projecting the projected scanning direction vector and the projected LOS vector onto a plane in which the yaw angle is measured. The orbiting satellite 200 may calculate the tilt angle β using Equation 13 shown below.

$$\beta = \tan^{-1}\left(\frac{a\tan(\phi)}{b\tan(\theta)}\right)$$ [Equation 13]

The orbiting satellite 200 may calculate a GSD based on the sensed yaw angle $\psi$, the calculated tilt angle β, and the major axis a and the minor axis b. For example, the orbiting satellite 200 may calculate a GSD d using Equation 14 shown below.

$$d = \sqrt{a^2\cos(\psi+\beta)^2 + b^2\sin(\psi+\beta)^2}$$ [Equation 14]

Figure 5:
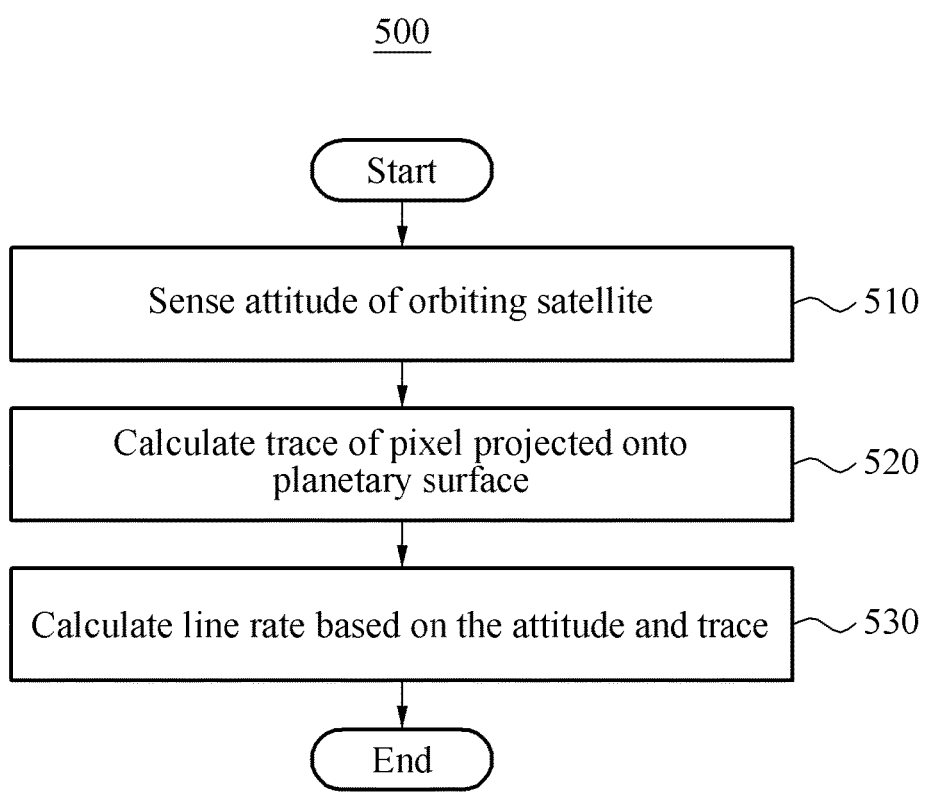
FIG. 5 is a flowchart illustrating a method of calculating a line rate according to an embodiment.

FIG. 5 is a flowchart illustrating a method 500 of calculating a line rate according to an embodiment. In the method 500, a line rate corresponding to a scanning direction of an orbiting satellite may be calculated. The orbiting satellite may change the scanning direction by changing an attitude of the orbiting satellite. Using the method 500, it is possible to expect an effect of calculating a more accurate line rate despite an arbitrary scanning direction of the orbiting satellite. When a more accurate line rate is obtained, it is possible to prevent an overlap or loss of portions of image data that is acquired by the orbiting satellite and that corresponds to an object to be measured during wide area imaging.

Referring to FIG. 5, in operation 510, the attitude may be sensed. The attitude may include a roll angle, a pitch angle and a yaw angle. For example, an inertial measurement unit (IMU) included in the orbiting satellite may be used to perform operation 510. The IMU may be, for example, a multi-sensor including an acceleration sensor used to measure a movement inertia, a gyro sensor used to measure a rotational inertia, and a geomagnetic sensor used to measure an azimuth.

In operation 520, a length of a pixel projected onto a planetary surface scanned by the orbiting satellite may be calculated. For example, in operation 520, a trace of the projected pixel may be calculated based on a change in the yaw angle.

For example, when a pixel obtained by the orbiting satellite has a circular shape, a trace of a pixel projected onto the planetary surface may have an elliptical shape. In this example, in operation 520, a major axis and a minor axis of an ellipse corresponding to the trace may be calculated, and an elliptical equation may also be calculated as the trace. In operation 520, a processor included in the orbiting satellite may calculate the major axis and the minor axis using either Equation 4 or 12.

In operation 530, the line rate may be calculated based on the attitude and the trace. When the yaw angle is set to "0," each of vectors obtained by projecting a scanning direction vector and a LOS vector of the orbiting satellite onto the planetary surface may be projected onto a plane in which the yaw angle is measured in operation 530. Also, in operation 530, a tilt angle β between the projected scanning direction vector and the projected LOS vector may be calculated. For example, in operation 530, the processor may calculate the tilt angle β using Equation 13. In addition, in operation 530, a GSD corresponding to a length of the pixel projected onto the planetary surface may be calculated using Equation 14.

The method 500 including the above-described operations 510 through 530 may be implemented by an apparatus corresponding to the method 500. For example, a control apparatus for controlling an orbiting satellite that includes a sensor including a plurality of inertial sensors and a processor configured to calculate a line rate may be used.

The line rate may be defined as shown in Equation 1. A ground velocity may refer to a ground velocity of a LOS of a satellite camera. For example, when the satellite is a fixed satellite, the ground velocity may have a value determined to correspond to a velocity of rotation of a planet based on a satellite altitude. In an orbiting satellite according to an embodiment, either a preset velocity or a velocity set based on an altitude may be used as a ground velocity. In accordance with an embodiment, a GSD corresponding to a change in a yaw angle of an orbiting satellite may be calculated, and a more accurate line rate may be calculated based on the GSD. Also, it is possible to expect an effect of more accurately or closely observe a measurement object by adjusting a scanning speed of an orbiting satellite based on the line rate.

Figure 6:
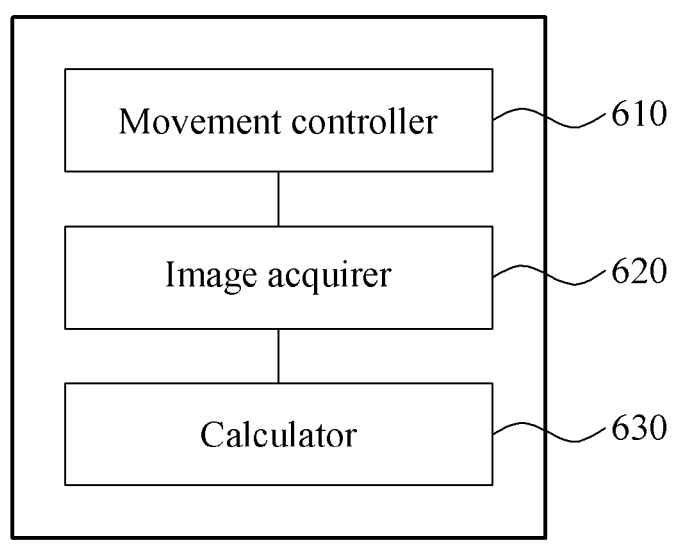
FIG. 6 is a block diagram illustrating a configuration of an orbiting satellite according to an embodiment.

FIG. 6 is a block diagram illustrating a configuration of an orbiting satellite 600 according to an embodiment. The orbiting satellite 600 may include a movement controller 610, an image acquirer 620 and a calculator 630. The movement controller 610 may control an attitude including an orbital velocity, a roll angle, a pitch angle and a yaw angle of the orbiting satellite 600. For example, the movement controller 610 may be implemented as an actuator, for example, a magnetic torquer, a momentum wheel, a reaction wheel and a thruster. The magnetic torque may have a shape of a cylindrical rod worn by coils, and may be an apparatus for generating a magnetic dipole moment, for generating a control torque by an interaction with an earth's magnetic field, and for rotating a satellite when the satellite is located at an angle deviating from a reference axis. The momentum wheel and the reaction wheel may be an apparatus for controlling an attitude of a satellite using an internal wheel that quickly rotates. The thruster may be an apparatus for obtaining a force by discharging of a gaseous jet and for generating a torque by multiplication of a center of mass and a moment arm of the thruster, to allow a satellite to horizontally move or rotate. The image acquirer 620 may scan a planetary surface in a scanning direction corresponding to the attitude. The image acquirer 620 may be implemented as, for example, a CCD type high-resolution camera.

The calculator 630 may calculate a line rate determined based on the yaw angle and the orbital velocity of the orbiting satellite 600. Also, the calculator 630 may determine a scanning speed of the image acquirer 620 based on the calculated line rate. Accordingly, the image acquirer 620 may collect image data of the planetary surface at a scanning speed corresponding to a ground velocity of the orbiting satellite 600. The above-described method 500 of FIG. 5 and Equations 1 through 14 may be applicable to a method by which the calculator 630 calculates the line rate.

The devices described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An orbiting satellite comprising:
a movement controller configured to control an attitude of the orbiting satellite, the attitude comprising an orbital velocity, a roll angle, a pitch angle and a yaw angle of the orbiting satellite;
an image acquirer configured to scan a planetary surface in a scanning direction corresponding to the attitude; and
a calculator:
wherein the calculator is configured to:
calculate a major axis and a minor axis of an ellipse corresponding to a trace of a pixel projected onto the planetary surface based on a change in the yaw angle;
calculate a tilt angle between a direction vector and a line of sight (LOS) vector projected onto the planetary surface; and
calculate a ground sample distance (GSD) according to the following equation:

$$GSD = \sqrt{a^2 \cos(\psi+\beta)^2 + b^2 \sin(\psi+\beta)^2}$$

wherein:
a is a length of the major axis;

ψ is the yaw angle;
β is the calculated tilt angle; and
b is a length of the minor axis.

2. The orbiting satellite of claim 1, wherein the calculator is configured to project, onto a plane in which the yaw angle is measured, direction vector and the line of sight (LOS) vector of the image acquirer onto the planetary surface, and to calculate the tilt angle between the projected direction vector and the projected LOS vector when the yaw angle is set to "0".

3. The orbiting satellite of claim 2, wherein the calculator is configured to calculate the line rate based on the GSD and the orbital velocity.

4. The orbiting satellite of claim 1, wherein the calculator is configured to calculate a line rate based on ground sample distance (GSD).

5. The orbiting satellite of claim 4, wherein the calculator is configured to calculate a line rate based on the ground sample distance (GSD) and the orbital velocity of the satellite.

6. The orbiting satellite of claim 5, wherein the calculator is configured to determine a scanning speed of the image acquirer based on the calculated line rate.

7. The orbiting satellite of claim 1, wherein:
the movement controller is an actuator selected from the group consisting of: a magnetic torquer; a momentum wheel; a reaction wheel and a thruster; and/or
the image acquirer is a charge coupled device (CCD).

8. A method of controlling an orbiting satellite, wherein the orbiting satellite comprises a movement controller configured to control an attitude of the orbiting satellite and an image acquirer configured to scan a planetary surface in a scanning direction corresponding to the attitude, and wherein the method comprises:
sensing the attitude of the orbiting satellite, the attitude comprising a roll angle, a pitch angle and a yaw angle of the orbiting satellite;
calculating a major axis and a minor axis of an ellipse corresponding to a trace of a pixel projected onto the planetary surface by the orbiting satellite based on a change in the yaw angle;
calculating a tilt angle between a scanning direction vector and a line of sight (LOS) vector projected onto the planetary surface;
calculating a ground sample distance (GSD) according to the following equation:

$$GSD = \sqrt{a^2 \cos(\psi+\beta)^2 + b^2 \sin(\psi+\beta)^2}$$

wherein:
a is a length of the major axis;
ψ is the yaw angle;
β is the calculated tilt angle; and
b is a length of the minor axis;
calculating a line rate corresponding to a scanning direction of the orbiting satellite based on the ground sample distance (GSD); and
adjusting the scanning speed of the orbiting satellite based on the line rate.

9. The method of claim 8, wherein the length of the major axis and the length of the minor axis are calculated based on:
a radius of the planet;
an altitude from the planet to the orbiting satellite;
an angle at which a pixel is viewed from a scanning focal point of the orbiting satellite; and
an angle between a vertical vector from the orbiting satellite to the planet and a vector from the orbiting satellite to a scanning point at which the planet is scanned.

10. The method of claim 9, wherein calculating comprises:
setting the yaw angle to "0"; and
projecting, onto a plane in which the yaw angle is measured, each of the scanning direction vector of the orbiting satellite and the line of sight (LOS) vector between the orbiting satellite and a scanned object onto the planetary surface; and
determining the tilt angle between the projected scanning direction vector and the projected LOS vector.

11. The method of claim 8, wherein the length of the major axis and the length of the minor axis are calculated using the following equation:

$$a = \frac{c}{\cos(\theta)\cos(\phi)}, b = c$$

where a denotes the length of the major axis, b denotes the length of the minor axis, φ denotes the roll angle, θ denotes the pitch angle, and c denotes the length of the pixel.

12. The method of claim 11, wherein calculating the tilt angle comprises:
setting the yaw angle to "0"; and
projecting, onto a plane in which the yaw angle is measured, each of the scanning direction vector of the orbiting satellite and the line of sight (LOS) vector between the orbiting satellite and a scanned object onto the planetary surface; and
determining the tilt angle between the projected scanning direction vector and the projected LOS vector.

13. The method of claim 10, wherein the tilt angle is calculated using the following equation:

$$\beta = \tan^{-1}\left(\frac{a\tan(\phi)}{b\tan(\theta)}\right)$$

where β denotes the tilt angle, φ denotes the roll angle and θ denotes the pitch angle.

14. The method of claim 8, wherein:
the movement controller is an actuator selected from the group consisting of: a magnetic torquer; a momentum wheel; a reaction wheel and a thruster; and/or
the image acquirer is a charge coupled device (CCD).

15. A non-transitory computer-readable storage medium storing a program for causing a processor to perform a method of controlling an orbiting satellite, wherein the orbiting satellite comprises a movement controller configured to control an attitude of the orbiting satellite and an image acquirer configured to scan a planetary surface in a scanning direction corresponding to the attitude, and wherein the program comprises:
a set of instructions to calculate a major axis and a minor axis of an ellipse corresponding to a trace of a pixel projected onto the planetary surface scanned by the orbiting satellite based on a change in a yaw angle of the orbiting satellite; and
a set of instructions to calculate a tilt angle between a scanning direction vector and a line of sight (LOS) vector projected onto the planetary surface;

a set of instructions to calculate a ground sample distance (GSD) according to the following equation:

$$GSD = \sqrt{a^2\cos(\psi+\beta)^2 + b^2\sin(\psi+\beta)^2}$$

wherein:
a is a length of the major axis;
$\psi$ is the yaw angle;
$\beta$ is the calculated tilt angle; and
b is a length of the minor axis;
a set of instructions to calculate a line rate corresponding to a scanning direction of the orbiting satellite based on the ground sample distance (GSD); and
a set of instructions to adjust the scanning speed of the orbiting satellite based on the line rate.

16. The non-transitory computer-readable storage medium of claim 15, comprising:
a set of instructions to calculate the length of the major axis and the length of the minor axis based on:
a radius of the planet;
an altitude from the planet to the orbiting satellite;
an angle at which a pixel is viewed from a scanning focal point of the orbiting satellite; and
an angle between a vertical vector from the orbiting satellite to the planet and a vector from the orbiting satellite to a scanning point at which the planet is scanned.

17. The non-transitory computer-readable storage medium of claim 15, comprising:
a set of instructions to calculate the length of the major axis and the length of the minor axis based on the following equations:

$$a = \frac{c}{\cos(\theta)\cos(\phi)}, \quad b = c$$

where a denotes the length of the major axis, b denotes the length of the minor axis, $\phi$ denotes the roll angle, $\theta$ denotes the pitch angle, and c denotes the length of the pixel.

18. The non-transitory computer-readable storage medium of claim 15, comprising:
a set of instructions to calculate the tilt angle using the following equation:

$$\beta = \tan^{-1}\left(\frac{a\tan(\phi)}{b\tan(\theta)}\right)$$

where $\beta$ denotes the tilt angle, $\phi$ denotes the roll angle and $\theta$ denotes the pitch angle.

19. The non-transitory computer-readable storage medium of claim 15, wherein:
the movement controller is an actuator selected from the group consisting of: a magnetic torquer; a momentum wheel; a reaction wheel and a thruster; and/or
the image acquirer is a charge coupled device (CCD).

* * * * *